(12) United States Patent
Byrne

(10) Patent No.: US 10,574,016 B2
(45) Date of Patent: Feb. 25, 2020

(54) PROCESS FOR FORMING END PRODUCT WITH INITIAL AND SIMULTANEOUS FORMATION OF SUBCOMPONENTS FROM SEPARATE WORK PIECES

(71) Applicant: Norman R Byrne, Ada, MI (US)

(72) Inventor: Norman R Byrne, Ada, MI (US)

( * ) Notice: Subject to any disclaimer, the term of this patent is extended or adjusted under 35 U.S.C. 154(b) by 438 days.

(21) Appl. No.: 15/223,067

(22) Filed: Jul. 29, 2016

(65) Prior Publication Data
US 2017/0054262 A1  Feb. 23, 2017

Related U.S. Application Data

(63) Continuation-in-part of application No. 13/419,103, filed on Mar. 13, 2012.

(Continued)

(51) Int. Cl.
| | |
|---|---|
| *H01R 43/16* | (2006.01) |
| *B21D 22/02* | (2006.01) |
| *B21D 43/00* | (2006.01) |
| *B21D 43/02* | (2006.01) |
| *B23P 19/04* | (2006.01) |

(Continued)

(52) U.S. Cl.
CPC ............ *H01R 43/16* (2013.01); *B21D 22/02* (2013.01); *H01R 13/112* (2013.01); *H01R 13/2492* (2013.01); *B21D 43/00* (2013.01); *B21D 43/02* (2013.01); *B21D 43/026* (2013.01); *B23P 11/00* (2013.01); *B23P 19/02* (2013.01); *B23P 19/04* (2013.01)

(58) Field of Classification Search
CPC ........ B21D 22/02; B21D 43/00; B21D 43/02; B21D 43/026; B23P 11/00; B23P 19/02; B23P 19/04; H01R 43/16; H01R 13/2492; H01R 13/112; Y10T 29/49826; Y10T 29/49828; Y10T 29/49829; Y10T 29/49831; Y10T 29/5124; Y10T 29/5136; Y10T 29/5137; Y10T 29/53039; Y10T 29/53047; Y10T 29/53057
USPC ...... 29/428, 429, 430, 431, 563, 564, 564.1, 29/709, 711, 713; 72/404, 405.01
See application file for complete search history.

(56) References Cited

U.S. PATENT DOCUMENTS 1,397,020 A * 11/1921 Smith .................. B23P 21/004
 144/278.1
2,021,461 A   4/1934 Moon
(Continued)

*Primary Examiner* — Sarang Afzali
*Assistant Examiner* — Darrell C Ford
(74) *Attorney, Agent, or Firm* — Gardner, Linn, Burkhart & Ondersma LLP

(57) ABSTRACT

A process provides for manufacturing and formation of a series of metallic end products (220) within a stamping machine (100). The metallic end products (220) are formed from two subcomponents (176, 178) comprising a first work component (178) and a second work component (176). The work components (176, 178) are coupled together through a toggle lock procedure formed as part of the process. The two resultant work components (176, 178) which form the end product (220) are simultaneously formed, thereby providing significant advantages with respect to work cycle time to produce the resultant product, relative to the time required when individual work components are sequentially produced through the use of mechanical operations to which a first work component is processed, and then formation of a second work component is processed.

23 Claims, 10 Drawing Sheets

Related U.S. Application Data

(60) Provisional application No. 61/452,147, filed on Mar. 13, 2011.

(51) Int. Cl.
   *B23P 11/00* (2006.01)
   *B23P 19/02* (2006.01)
   *H01R 13/11* (2006.01)
   *H01R 13/24* (2006.01)

(56) References Cited

U.S. PATENT DOCUMENTS

| | | | | |
|---|---|---|---|---|
| 3,704,775 A * | 12/1972 | Eickenhorst | ......... | B21D 43/055 |
| | | | | 198/621.1 |
| 3,796,174 A * | 3/1974 | Wilson | .................. | A47J 36/022 |
| | | | | 493/74 |
| 4,160,312 A * | 7/1979 | Nyssen | ................. | B21C 37/121 |
| | | | | 138/150 |
| 4,265,508 A * | 5/1981 | Chisholm | ............. | H01R 43/205 |
| | | | | 206/717 |
| 4,589,184 A * | 5/1986 | Asano | .................... | B25J 9/0093 |
| | | | | 198/575 |
| 4,795,379 A | 1/1989 | Sasaki | | |
| 4,990,110 A | 2/1991 | Byrne | | |
| 5,239,739 A * | 8/1993 | Akeel | ................... | B23K 37/047 |
| | | | | 29/430 |
| 5,307,562 A * | 5/1994 | Denlinger | .............. | H01R 13/03 |
| | | | | 29/882 |
| 5,724,724 A * | 3/1998 | Kugo | .................... | B23P 21/004 |
| | | | | 198/346.1 |
| 5,915,745 A * | 6/1999 | Looverie | .............. | B23K 11/008 |
| | | | | 29/429 |
| 6,357,102 B1 * | 3/2002 | Benner | ................. | A61C 15/043 |
| | | | | 29/430 |
| 6,662,083 B2 * | 12/2003 | Angel | .................. | B23K 37/047 |
| | | | | 29/430 |
| 2002/0003021 A1 * | 1/2002 | Maxton | ............. | A61F 13/15764 |
| | | | | 156/199 |
| 2002/0162209 A1 * | 11/2002 | Hosono | .................. | B62D 65/06 |
| | | | | 29/430 |
| 2004/0025317 A1 * | 2/2004 | Belt | ....................... | A47F 5/0006 |
| | | | | 29/428 |
| 2004/0154161 A1 * | 8/2004 | Aoyama | ................ | B65G 29/00 |
| | | | | 29/739 |
| 2007/0084858 A1 * | 4/2007 | Pierron | ................ | B60H 1/2225 |
| | | | | 219/716 |
| 2007/0107186 A1 * | 5/2007 | Addison | ........... | H01L 21/67144 |
| | | | | 29/428 |
| 2008/0016669 A1 * | 1/2008 | Migliore | ................ | B23P 19/042 |
| | | | | 29/430 |
| 2011/0025441 A1 * | 2/2011 | Tien | ...................... | H01F 17/062 |
| | | | | 336/65 |
| 2011/0179627 A1 * | 7/2011 | Kondo | .................. | B23P 21/004 |
| | | | | 29/430 |
| 2014/0059855 A1 * | 3/2014 | Miyazaki | ............... | H01R 43/16 |
| | | | | 29/874 |
| 2014/0090227 A1 * | 4/2014 | Haas | ..................... | A21C 15/02 |
| | | | | 29/428 |
| 2014/0179132 A1 | 6/2014 | Byrne | | |
| 2015/0364838 A1 * | 12/2015 | Tonoike | ................. | H01R 4/187 |
| | | | | 439/879 |

\* cited by examiner

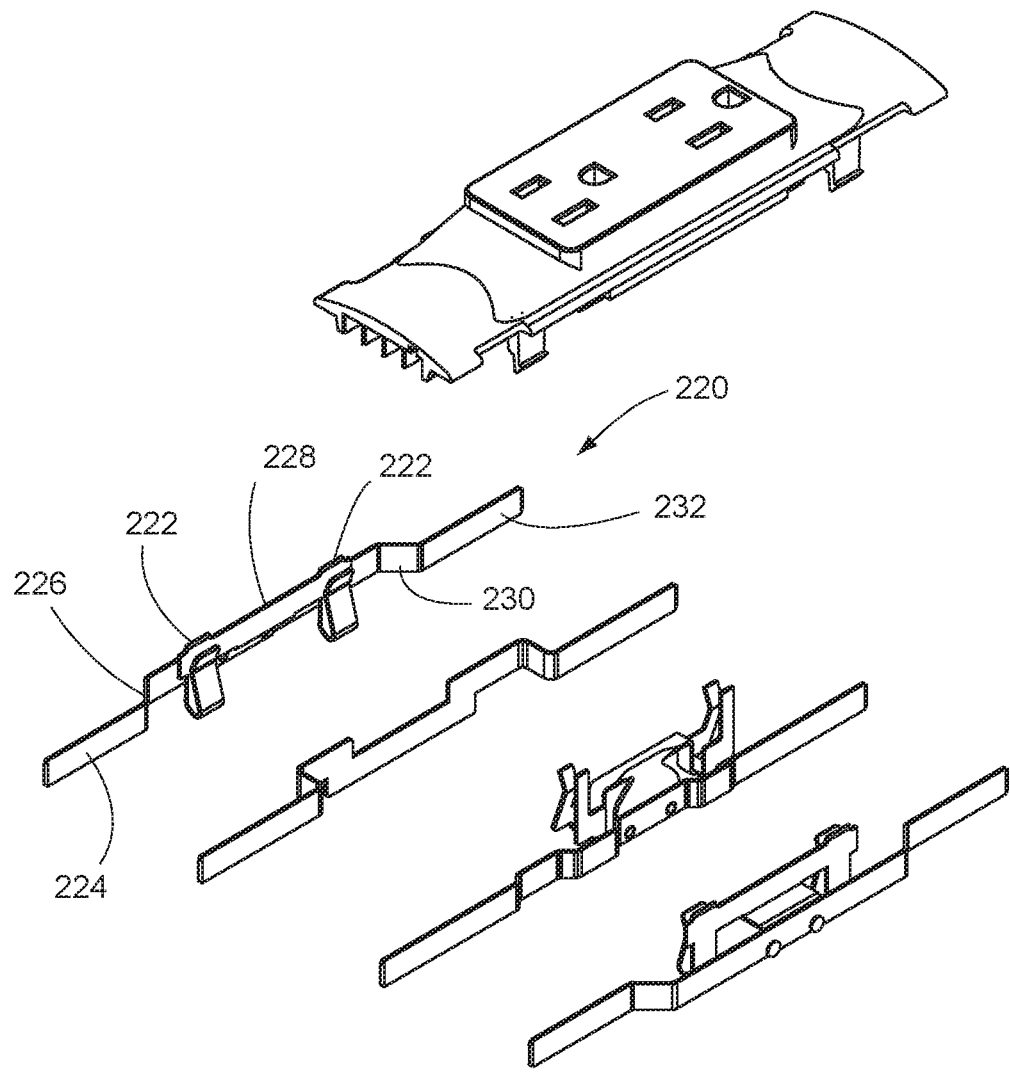
Fig. 18
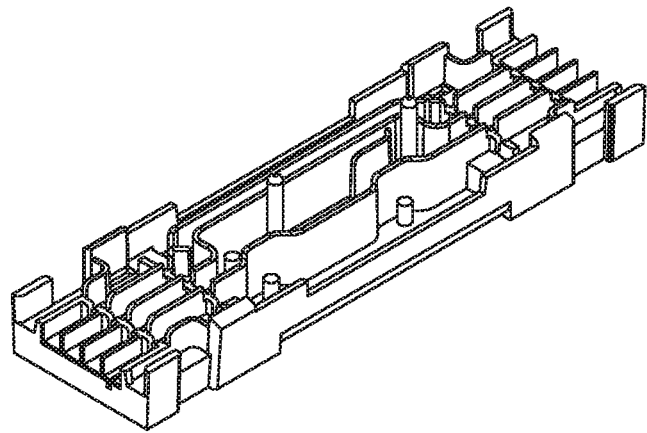

PROCESS FOR FORMING END PRODUCT WITH INITIAL AND SIMULTANEOUS FORMATION OF SUBCOMPONENTS FROM SEPARATE WORK PIECES

CROSS-REFERENCE TO RELATED APPLICATIONS

Not Applicable.

STATEMENT REGARDING FEDERALLY SPONSORED RESEARCH OR DEVELOPMENT

Not Applicable.

PARTIES TO A JOINT RESEARCH AGREEMENT

Not Applicable.

REFERENCE TO A SEQUENCE LISTING

Not Applicable.

BACKGROUND OF THE INVENTION

Field of the Invention

The invention relates generally to processes for manufacture of end products from individual work pieces and, more particularly, to processes involving the forming of metallic end products through die or stamping machine operations on work blanks.

Description of the Related Art

Historically, various types of machines and processes have been developed for performing machine functions on metallic work pieces which are formed into individual subcomponents and subsequently coupled together to form a metallic end product. Various known machines utilize die forming (typically performed by tool and diemakers) which are put into production after mounting into a die process. Similarly, stamping machines are also often used where sheet metal rolls (often called blanks) are utilized to form individual work pieces. Such machines typically include features comprising functions associated with punching or otherwise forming a series of spaced openings and stampings in the work blank.

Work associated with the advancement of the art with respect to die or stamping machines has been directed to speeding up the overall process of producing the metallic end product resulting from the separate mechanical operations performed on the work blanks so as to produce the individual metallic subcomponents of the end product. Work has also been done with respect to various means of interlocking or otherwise connecting together such subcomponent work pieces. Such interconnections or interlocking operations can include functions such as weldments, conventional rivets, nut/bolt connections and similar functions, including a process known as toggle locking. The toggle locking process is a proprietary one which can involve sheet metal subcomponents connected together through an interlock process, where parts are fastened to themselves, without the need for welding, glue, or other fasteners of any type. Numerous applications exist for toggle-lock technology, including applications in lighting and other consumer product industries.

As earlier mentioned, technological developments regarding stamping processes have involved the acceleration of the overall stamping operation. As an earlier example of work in this field, Moon, U.S. Pat. No. 2,021,461 (issued Nov. 19, 1935) discloses an automatic press particularly applicable for use in punching spaces between tynes in the production of conventional forks. At the time of the Moon developments, usual practices involved feeding blanks by hand into a press having spaced sets of dies for stamping the outer openings adjacent to the outer tynes, and leaving the inner tynes connected. A second manual operation would then take place, wherein the blank would be fed to a press having a single set of dies which performed only the single operation of stamping the central opening between the two center tynes.

In contrast, Moon discloses a press where all three openings in the blank are stamped with a single automatic feed. This is provided by causing a relative movement between the blank and a single set of dies. The process is accomplished with the automatic press being capable of stamping spaces between all of the tynes of the fork with one automatic feed into the press, while avoiding difficulties which are inherent in simultaneous stampings of several feeding operations.

The stamping operations described in Moon primarily involve activities associated with operations on a single work blank. Advancements in lessening of the overall time involved in producing a resultant end product are substantially more difficult when the end product is formed from separate work blanks having differing configurations and involving differing individual stamping or other functional operations.

SUMMARY OF THE INVENTION

In accordance with the invention, a process is provided for manufacturing and forming a series of metallic end products within a die or stamping machine. The process includes loading a first work blank having an elongated configuration into a first feeder assembly of the machine. A second work blank, also having a further elongated configuration, is loaded into a second feeder assembly of the machine. Following the loading, the first work blank is fed along a first conveyance, so that any given point on the first work blank will sequentially pass through a first pre-determined number of stages. Each stage can have a start time of $t_x$ and time interval of X seconds. At each of n stages of movement of the first work blank while on the first conveyance, one or more mechanical processes are performed on the blank, as the blank is moved along the first conveyance.

Upon completion of the end stages of the first conveyance of the first work blank, a separate first work component has been completed. The inventive process involves continuing to form new and completed first work components upon completion of each of the stages of the first conveyance, following an initial start-up of the machine.

Further in accordance with the invention, and simultaneously with the feeding of the first work blank along the first conveyance, the process involves the feeding of the second work blank along a second conveyance. This feeding of the second work blank occurs so that any given point on the second work blank will sequentially pass through a second predetermined number of stages, where each stage has a start time of $t_y$ and time interval of Y seconds.

At each of the m stages of movement of the second work blank along the second conveyance, one or more mechanical processes are performed on the second work blank as the blank is moved along the second conveyance. Upon completion of the m stages of the second conveyance of the second work blank, a separate second work component has been completed. The process further involves continuing to form a new and completed second work blank upon completion of each of the stages of the second conveyance. Still further, the start time is $t_x$ and $t_y$ and the time intervals of X seconds and Y seconds, are correlated so that one of the new first work components is completed at substantially the same time as completion of one of the second work components. The process further involves having each first work component being positioned physically close to a corresponding one of the second work components, upon completion of manufacture of each of the first and second work components. Each of the first work components is then securely coupled together with a corresponding one of the second work components. In this manner, manufacturing and formation of individual ones of the metallic end products is achieved.

Further in accordance with other concepts of the invention, the step of securely coupling together each of the first work components with a corresponding one of the second work components comprises a toggle locking process. This process involves the first work components and corresponding ones of the second work components being interconnected through an interlock process, where the first and second work components are fastened together without a need for welding, glue, or separate fasteners of any type.

The first work blank can be loaded on a continuous feed reel in the form of a sheet metal roll. Similarly, the second work blank can be loaded on a second continuous feed reel in the form of a further sheet metal roll. The first work blank is formed into a series of first work components having an elongated configuration and adapted for use as conductive buss bars.

In accordance with further concepts associated with the inventive process, one of the mechanical processes performed on the first work blank during one of the end stages of movement comprises the stamping of perforations inwardly from opposing lateral edges of the first work blank. The mechanical processes performed on the first work blank during another one of the end stages of movement comprises the stamping of perforations adjacent opposing lateral edges of the first work blank. Further, another one of the mechanical processes performed on the first work blank during a still further one of the end stages of movement comprises a bending of predetermined sections of the first work blank. Still further, another one of the mechanical processes performed on the first work blank during a further one of the end stages of movement comprises the stamped cutting of the first work blank following formation of perforations and bending of sections of the first work blank, so as to form a series of identical first work components.

In accordance with other concepts of the invention, each of the first work components can include a buss bar having an elongated configuration with a first planar section, first angled section integral with the first planar section, second planar section integral with the first angled section, second angled section integral with the second planar section, and a third planar section integral with the second planar section, so that opposing ends of the first and third planar sections consist of male blade terminals.

With respect to additional concepts of the invention, the second work blank can be, in original form, an elongated and planar roll of sheet metal. A first one of the mechanical work processes performed on the second work blank during a first one of the m stages of movement consists of the formation of a pair of elongated perforations parallel to each other and extending longitudinally along the second work blank. A second one of the mechanical processes performed on the second work blank during a second one of the m stages of movement consists of the bending of opposing sections of the second work blank. Still further, a third one of the mechanical processes performed on the second work blank during a third one of the m stages of movement includes a further bending back of the previously bended sections, so as to form a pair of female terminals located along opposing edges of the second work blank.

In accordance with further concepts of the invention, each of the second work components can include a terminal piece having a pair of electrical female terminal pairs. Still further, the process can include the concept of the time interval of Y seconds being equal to the time interval of X seconds. Still further, each of the start times $t_x$ can correspond to one of the start times $t_y$. In addition, the movement of the first work blank in stages along the first conveyance can be synchronized with movement of the second work blank in stages along the second conveyance. Still further, each of the first work components can be simultaneously manufactured with a corresponding one of the second work components.

BRIEF DESCRIPTION OF THE DRAWINGS

The invention will now be described, with respect to the drawings, in which:

FIG. 1 further shows representative views of the first work blank in a representative set of five stages of mechanical processes, along with the second work blank and the stages where mechanical processes are performed, along with a representation of a metallic end product;

FIG. 18 is an exploded view of a junction block for use in an electrical raceway in a commercial furniture environment, with the junction block having an integral receptacle set and a buss bar with connected female terminals which is shown as being formed in FIGS. 2-17.

DETAILED DESCRIPTION OF THE PREFERRED EMBODIMENT

Figure 1:
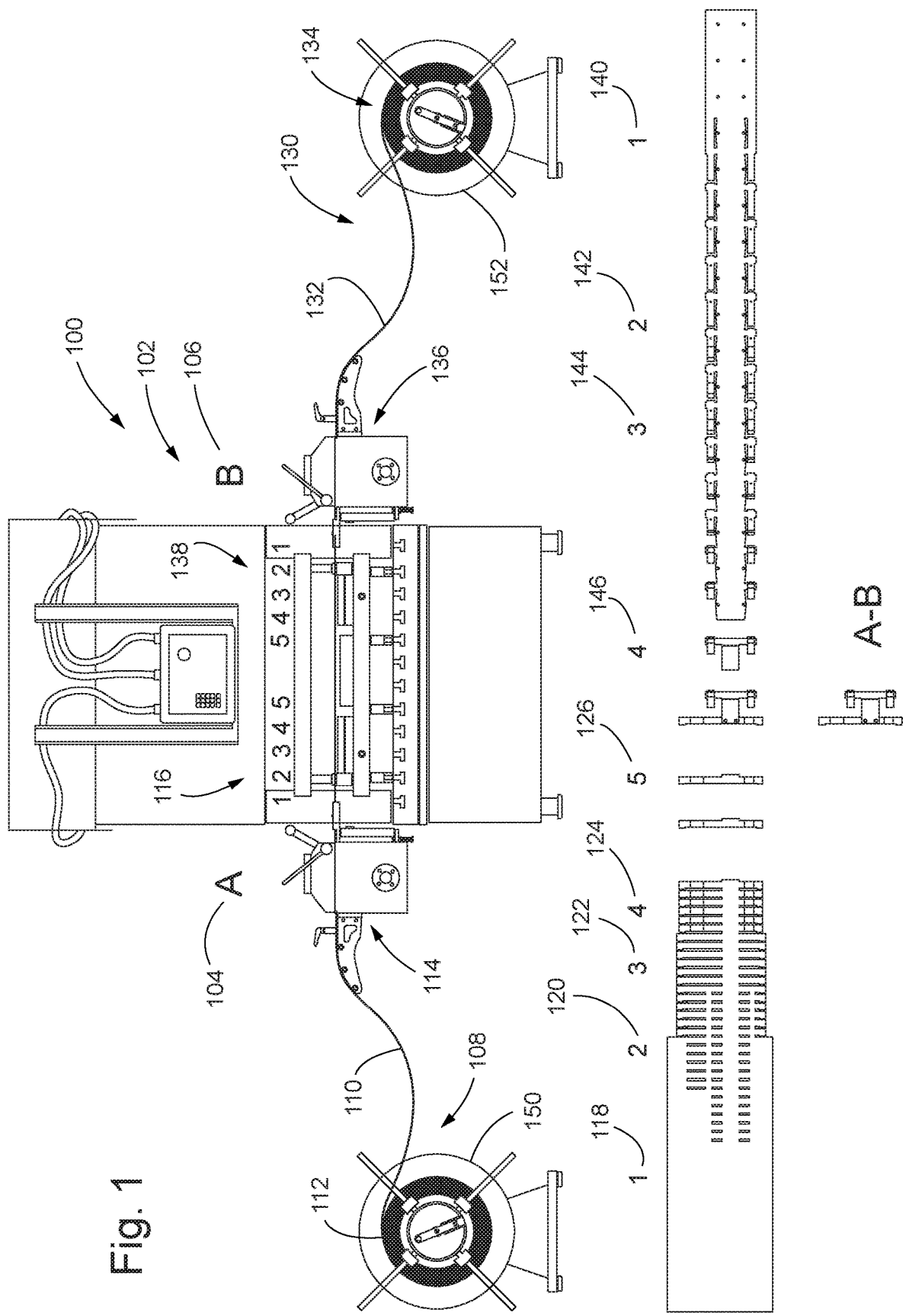
FIG. 1 is a front elevation view of a stamping machine, with a pair of attendant sheet reels, feeders, and conveyances for sheet metal rolls forming work blanks.

The principles of the invention are disclosed, by way of example, in a stamping machine 100 as illustrated in FIGS. 1-17. The stamping machine 100 as described and illustrated herein is an example of a machine which can be used to perform a process in accordance with the invention, for producing an electrical busbar with a pair of female terminals, as illustrated in the exploded view of FIG. 18. The process in accordance with the invention as disclosed herein comprises a process for formation of a metallic end product having two subcomponents which are coupled together at the end of the process, with the subcomponents comprising metallic work pieces which are simultaneously subjected to various mechanical operations to produce the resultant pair of work components. In the particular embodiment shown herein, the separately, but simultaneously, formed work components are coupled together through a toggle lock process. The simultaneous formation of the two resultant work components provides significant advantages with respect to work cycle time to produce the metallic end product, relative to the time required when the individual work components are sequentially produced through the use of mechanical operations to which a first work component is subjected, and then formation of the second work component through subjecting the component to other mechanical operations occurring in seriatim following production of the first work component.

It should be emphasized that the process described herein, with respect to the stamping machine 100 in the drawings, represents only a single embodiment of a process in accordance with the invention. Numerous other machines and related processes can be utilized, without departing from the spirit and scope of the novel concept of the invention. For example, the stamping machine 100 and its associated processes described herein utilizes a toggle lock interconnection between the work components, so as to form the metallic end products. However, numerous other interconnection and interlocking processes can be utilized. For example, the separate work components formed in accordance with the invention can be coupled or otherwise interlocked together through the use of weldments, adhesives (such as glue and the like), mechanical nut/bolt configurations, and other well-known connection methods. However, the fact that other interconnection methods can be used without departing from the principal concepts of the invention, should not be construed as a belief that use of a toggle lock process to couple the separate work components described herein, so as to produce a resultant work product in the form of a busbar with associate female terminals, is not a useful and efficient process for performing interlocking functions for such metallic end products.

Referring specifically to FIG. 1, the stamping machine 100 (shown in a combination of an elevation and diagrammatic view) can be any number of die and stamping machine types. Such machines are commercially available in various forms on the market. The stamping machine includes a main body 102, where the mechanical operations are performed on separate work blanks. To assist in understanding the inventive process, the stamping machine 100 is illustrated as having two separate "sides," identified as side A (with reference to numeral 104) and side B (with reference to numeral 106). The illustration of the opposing separate sides may be a true physical rendition of the stamping machine 100, but may also primarily be a "functional" illustration to better understand the operations of the machine 100.

The stamping machine 100 can be characterized as including not only a main body 102, but also a first feeder assembly 108. The feeder assembly 108 is utilized to transport a first work blank 110 from a first sheet metal roll 112. The sheet metal roll 112 is loaded onto a first continuous feed reel 150. The feeder assembly 108 transports the first work blank 110 from the feed reel 150 to the main body 102 of the machine 100, through the use of a first conveyance 114. The first conveyance 114 is essentially symbolically illustrated in FIG. 1, but can consist of a number of commercially available and known shuttle conveyers. The shuttle conveyors can be timed to predetermined operating speeds, and times when the conveyance stops, as well as the time window during which any shuttle stoppage with occur. The first conveyance 114 will cause the first work blank 110 to move into the main body 102 of the machine 100. Therein, the first work blank 110 can be shuttled through a number of stages of traverse, where the conveyer action will stop at predetermined times, with the stoppage occurring for predetermined time periods. The type and quantity of mechanical operations which will be performed on the first work blank 110, relative to the other work blank subsequently described herein, will determine actions and time periods for shuttle movement of the first work blank 110 through the machine 100. As an example in accordance with the embodiment described herein, the first work blank 110 can be in the form of an elongated strip of sheet metal having a planar configuration. In the particular example with this embodiment, the first work blank 110 is shown to shuttle through a set of first work stages 116. In the embodiment disclosed herein, the work stages are five in number. Each work stage 116 can involve various mechanical operations, such as cutting functions, bending operations and the like. The work stages 116 are symbolically illustrated in FIG. 1 as consisting of a first stage 118, second stage 120, third stage 122, fourth stage 124 and fifth stage 126. The fifth stage 126 can actually be considered to be a stage where the first work component is interlocked with the second work component as described in subsequent paragraphs herein. It should also be emphasized that although the embodiment described herein includes five work stages 116, the number of work stages could be any number required to form the appropriate first metal component. Accordingly, the stages required for the first set of work stages 116 can generically be described as consisting of n stages.

In summary, the first conveyance 114 moves the first work blank 110 in steps, with certain steps or stages being ones where actual mechanical operations are performed on the first work blank. Again, in this particular embodiment, the n stages of actual mechanical operations is five in number for the first work component.

In addition to the components of the machine 100 associated with the formation of a first work component from the first work blank 110, the stamping machine 100 includes a second feeder assembly 130. The second feeder assembly 130 is utilized to transport a second work blank 132 from a second sheet metal roll 134. The sheet metal roll 134 is loaded onto a second continuous feed reel 152. The second feeder assembly 130 transports the second work blank 132 from the feed reel 152 to the main body 102 of the machine 100, through the use of a second conveyance 136. The second conveyance 136 is essentially symbolically illustrated in FIG. 1, but can consist of any one of a number of commercially available and known shuttle conveyors. The shuttle conveyor can be timed with respect to a predetermined overall speed of operation, and also predetermined times when the second conveyance 136 stops, as well as the time window during which any shuttle stoppage occurs.

The second conveyance 136 will cause the second work blank 132 to move into the main body 102 of the machine 100. Therein, the second work blank 132 can be shuttled through a number of stages of traverse, where the conveyor action will stop at predetermined times, with the stoppage occurring for predetermined time periods. The type and quantity of mechanical operations which will be performed on the second work blank 132, relative to the first work blank 110 previously described herein, will determine actions and time periods for shuttle movement of the second work blank 132 through the machine 100. As an example in accordance with the embodiment described herein, the second work blank 132 can be in the form of an elongated strip of sheet metal having a planar configuration. In the particular example associated with this embodiment, the second work blank 132 is shown to shuttle through a set of second work stages 138. Further in accordance with this particular embodiment, the stages are four in number. Each of the second set of work stages 138 can involve various mechanical operations, including cutting functions, bending operations and the like. The second work stages 138 are symbolically illustrated in FIG. 1 as consisting of a first stage 140, second stage 142, third stage 144, and fourth stage 146. The fourth stage 146 can essentially be considered to be a stage where the first work component is interlocked with the second work component as described in subsequent paragraphs herein. It should be emphasized that although the embodiment described herein includes four second work stages 138, the number of second work stages could be any number required to form the appropriate second work component. Accordingly, the stages required for the second set of second work stages 138 can generally be described as consisting of m stages. In summary, the second conveyance 136 moves the second work blank 132 in steps, with certain steps or stages being ones where actual mechanical operations are performed on the second work blank 132. Again, in this particular embodiment, the m stages of actual mechanical operations is four in number for the second work component.

Figure 2:
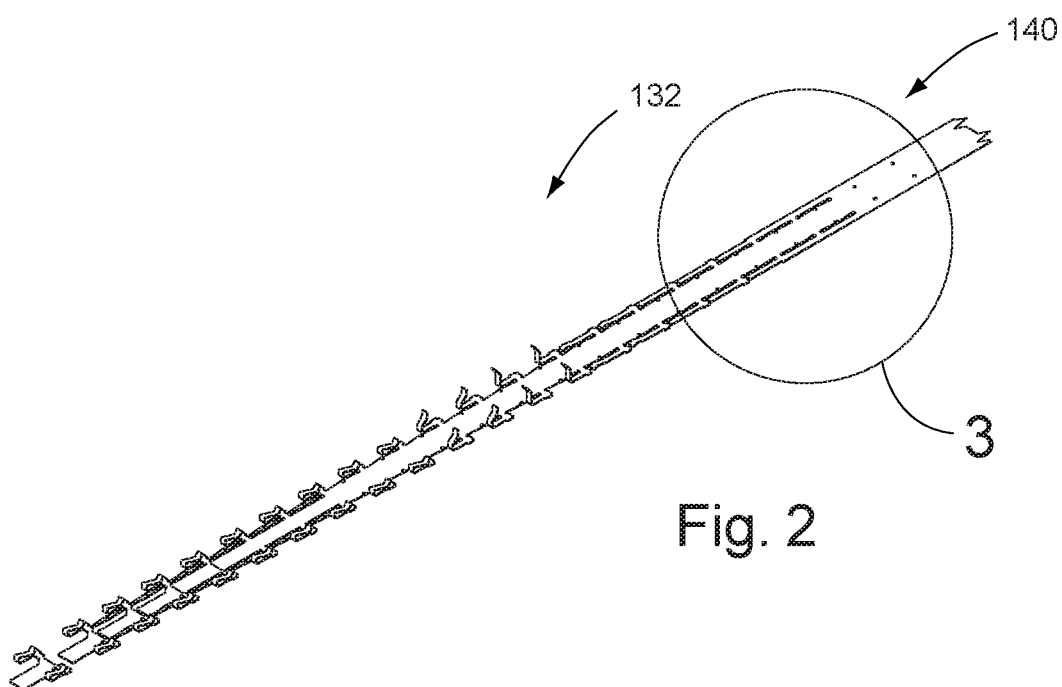
FIG. 2 is a perceptive view of the second work blank, and it's stages of performance of mechanical processes on the blank, with an initial stage of mechanical process performance shown as being encircled.
Figure 3:
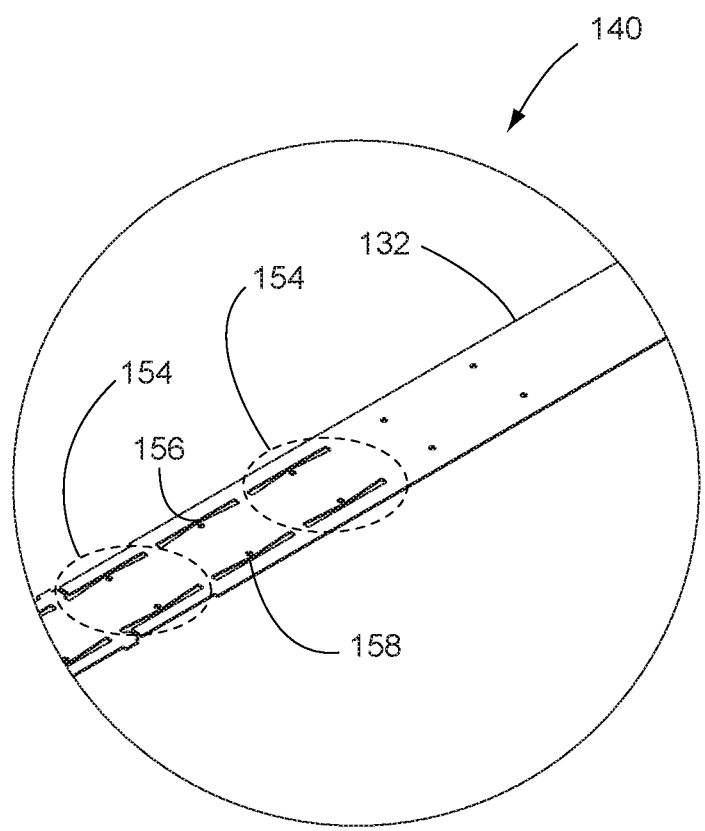
FIG. 3 is an enlarged view of the portion of the second work stamp shown within the circle of FIG. 2.

Turning to the description of the formation of individual work components, mechanical operations on the second work blank 132 will first be described, with respect to FIGS. 2-9. Specifically, FIGS. 2 and 3 illustrate mechanical operations associated with the first stage 140 of the m (where, in this particular instance m is equal to 4) stages of mechanical operations. Specifically, FIG. 2 illustrates, through circle 3, an area of the second work blank 132 where sets of perforation pairs 154 are stamped or otherwise cut through the second work blank 132. These perforation pairs 154 are best shown in FIG. 3. Each perforation pair 154 includes a first perforation 156 adjacent one side of the elongated work blank 132, and a second perforation 158 adjacent the other side of the work blank 132. The first and second perforations are parallel to each other. Following formation of the perforation pairs 154, the perforations 156 and 158 are cut through one end of each of the perforations, and half of the perforations 156, 158 are "bent back" so as to form initial terminal bend pairs 160. The initial terminal bend pairs 160 each have a first initial terminal bend 162, and a second initial terminal bend 164. The terminal bends 162, 164 are parallel to each other and extend laterally to include the edges of the work blank 132. These actions form the second stage 142 of mechanical operations to which the second work blank 132 is subjected.

Figure 4:
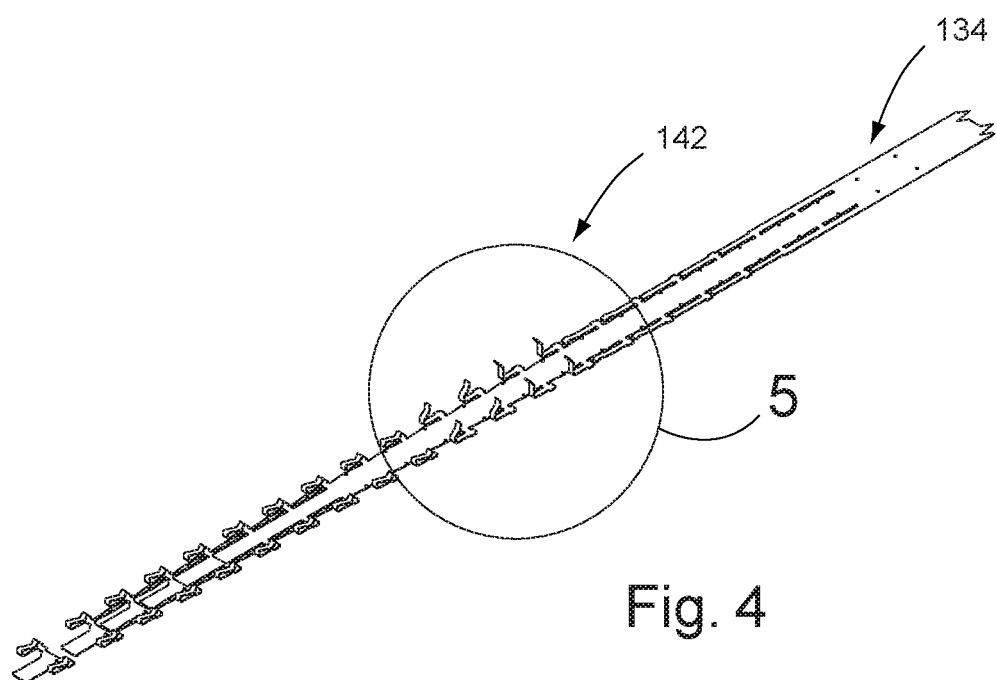
FIG. 4 is a perspective and diagrammatic view of the second work blank, with a circle which circumscribes a portion of the work blank where second stage mechanical operations are being performed.
Figure 5:
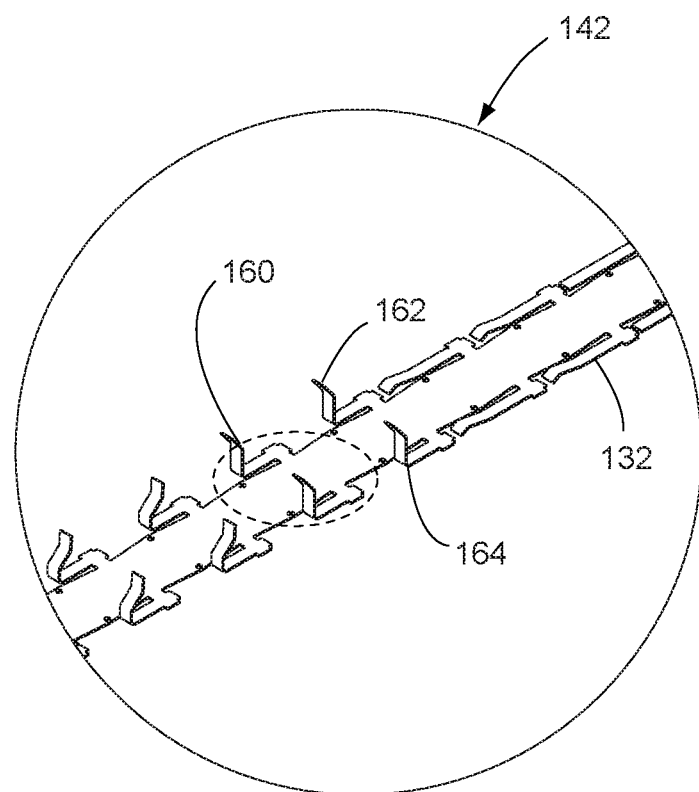
FIG. 5 is an enlarged view of the encircled portion of FIG. 4.
Figure 6:
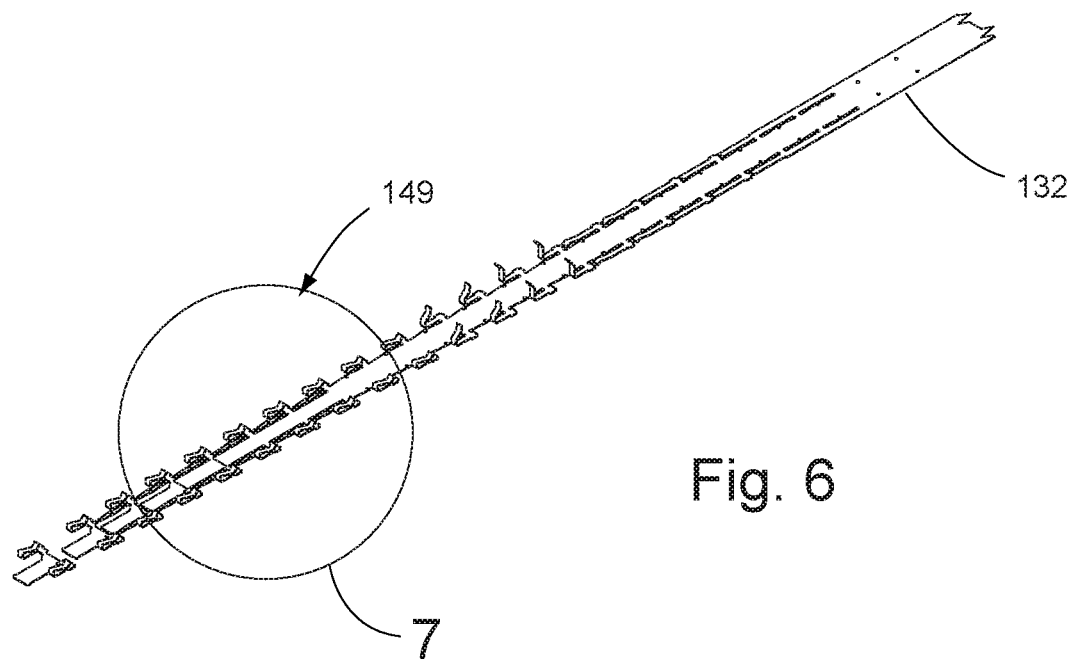
FIG. 6 is a perspective and diagrammatic view of the second work blank, with a circle which circumscribes a portion of the work blank where third stage mechanical operations are performed.
Figure 7:
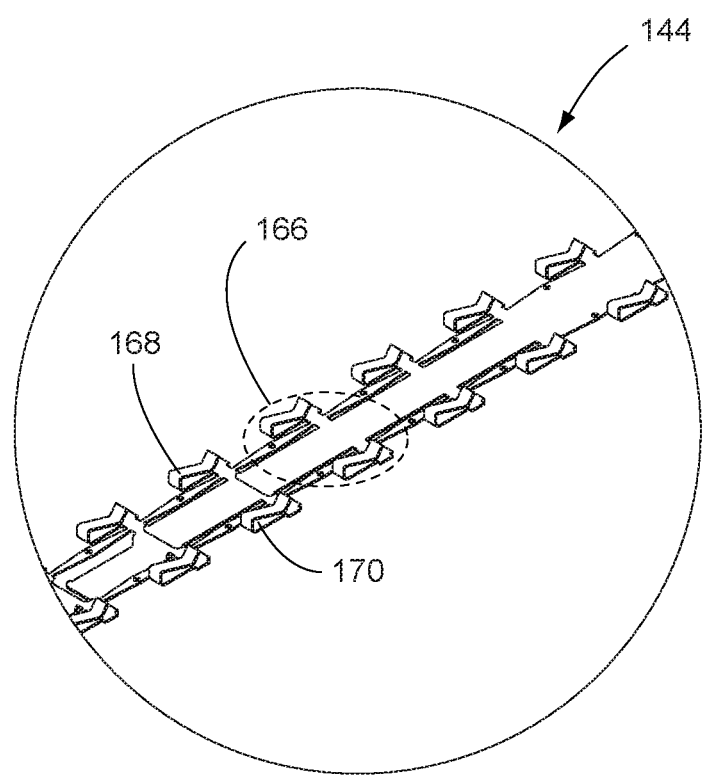
FIG. 7 is an enlarged view of the encircled portion of FIG. 6.

Following mechanical operations associated with the second stage 142 as shown in FIGS. 4 and 5, a third stage 144 and the mechanical operations associated therewith are shown in FIGS. 6 and 7. In this stage of operation, the second work blank 132 is subjected to further bending of the portions of the work blank which will become terminals. Specifically, FIGS. 6 and 7 show mechanical operations which can be characterized as full terminal bend pairs 166. Each full terminal bend pair 166 includes a first full terminal bend 168 and second full terminal bend 170. In this case, the portions of the terminals which were bent upwardly during operations associated with the second stage 142 are fully "bent back" as shown particularly in large view of FIG. 7. As apparent from FIG. 7, these full terminal bend sections form a pair of female terminals on the second work blank 132.

Figure 8:
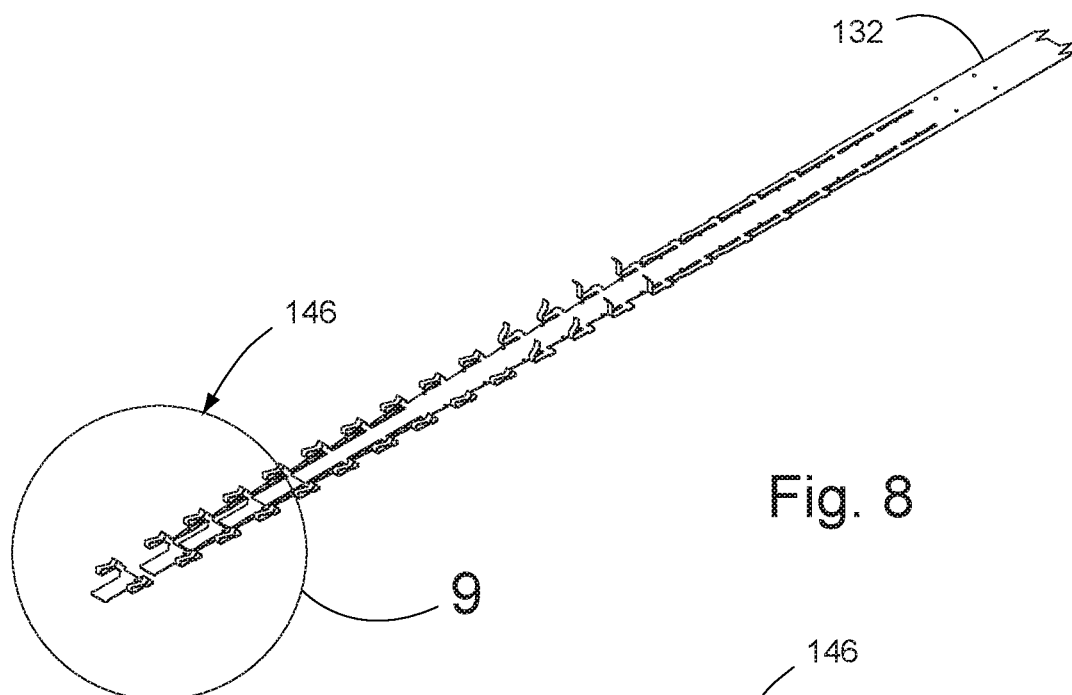
FIG. 8 is a perspective and diagrammatic view of the second work blank, with a circle which circumscribes a portion of the work blank where fourth stage mechanical operations are performed.
Figure 9:
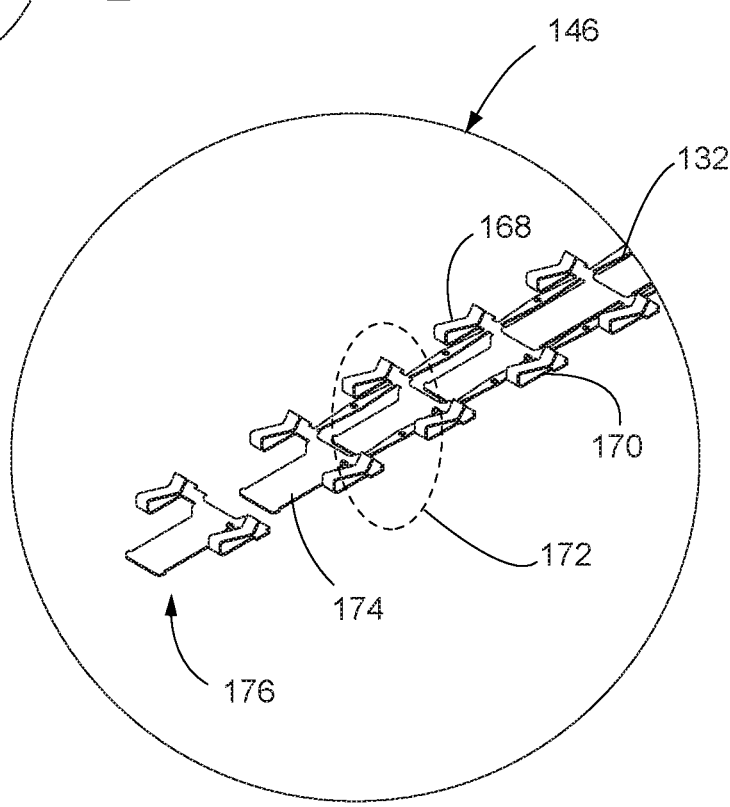
FIG. 9 is an enlarged view of the encircled portion of FIG. 8.

Following the mechanical operations applied to the second work blank 132 in the third stage 144, the blank 132 is shuttled forwardly and operations on the second work blank 132 are applied through a fourth stage 146 illustrated in FIGS. 8 and 9. Therein, a center cut operation 172 is applied to the portions of the work blank 132 which are then located at the position for the fourth stage 146. The center cut operation 172 includes a cutting of a center connection so as to form a center connector 174. With this mechanical operation at the fourth stage 146, individual and separate pieces of the second work blank 132 have been formed. These work pieces, as shown in FIG. 9, can be characterized as second work components 176.

It should be emphasized that although the individual stages of the second set of work stages 138 have been described herein sequentially, all of the mechanical operations associated with the individual m stages are occurring simultaneously, albeit on separate areas of the elongated second work blank 132. That is, while mechanical operations are being performed during the first stage 140 on a particular area of the work blank 132, mechanical operations associated with the fourth stage 146 (and all other stages) are being simultaneously performed on another area of the second work blank 132. The only time that mechanical operations in the individual stages are not being simultaneously performed would be when a second work blank 132 is initially loaded onto the machine 100. It is apparent that upon initial loading all, mechanical operations on an initial portion of the second work blank 132 will not be performed, until such time as the initial portion or area of the second work blank 132 has completed traverse through the areas where the initial three stages of mechanical operations are being performed. Also, it should again be emphasized that mechanical operations in accordance with the invention are not limited to the specific operations described herein, or the number of operations. Further, although time period windows for the performance of the various mechanical operations have been described herein as occurring for periods of Y seconds, such windows are matters of design choice, depending upon the particular operations and particular work components to be formed.

Figure 10:
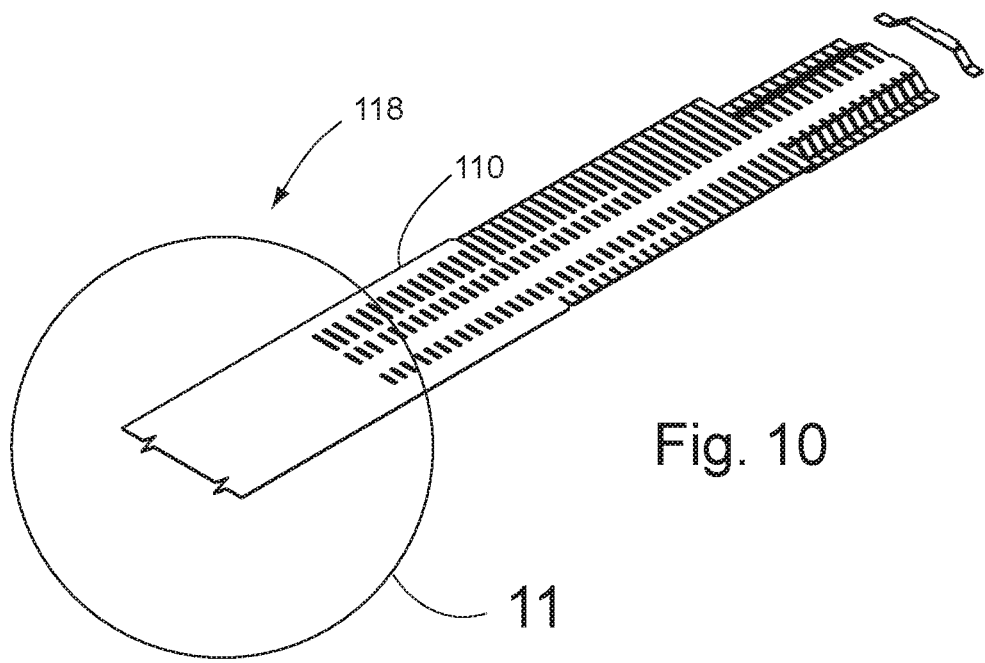
FIG. 10 is a perspective and diagrammatic view of a portion of the first work blank, with a circle which circumscribes a portion of the work blank where first stage mechanical operations are performed.
Figure 11:
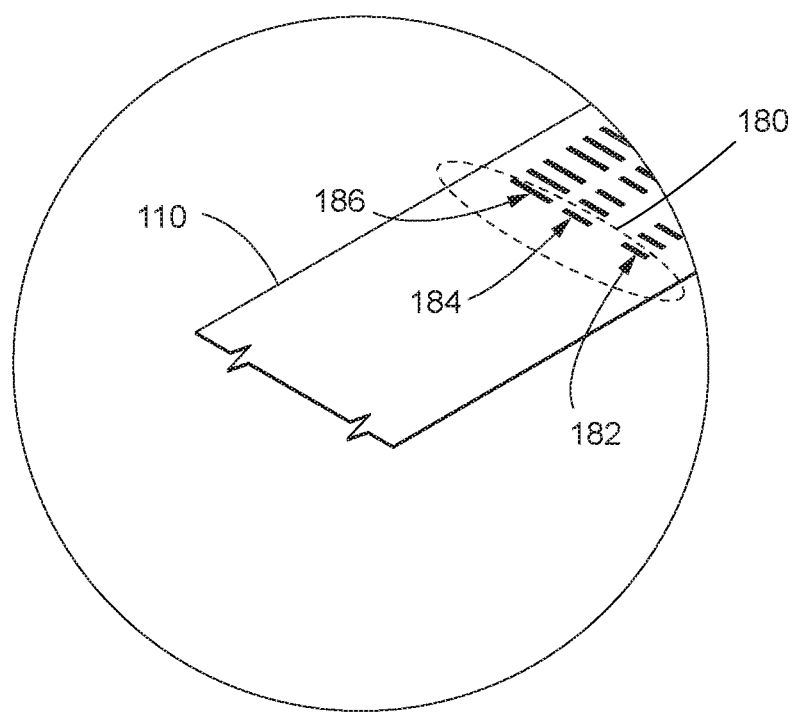
FIG. 11 is an enlarged view of the encircled portion of FIG. 10.

A first work component 178 formed from the first work blank 110 will now be described with respect to FIGS. 10-17. Referring first to FIGS. 10 and 11, these drawings illustrate a first stage 118 during which mechanical operations are applied to the first work blank 110. Specifically, FIG. 110 illustrates the formation of initial perforation sets 180 as part of the first stage 118 applied to the first work blank 110. The perforation sets 180 extend laterally across the work blank 110. With this particular embodiment, there are three perforations in each perforation set 180. Specifically, these include a first perforation 182, second perforation 184, and third perforation 186. These perforation sets 180 are best shown in the enlarged view of FIG. 11.

Figure 12:
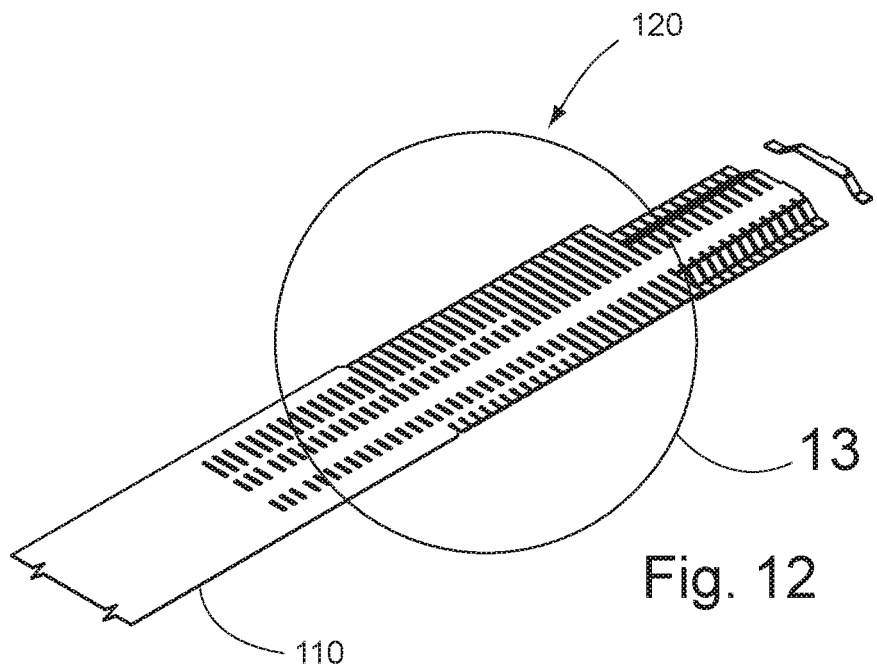
FIG. 12 is a perspective and diagrammatic view of the first work blank, with a circle which circumscribes a portion of the work blank where second stage mechanical operations are performed.
Figure 13:
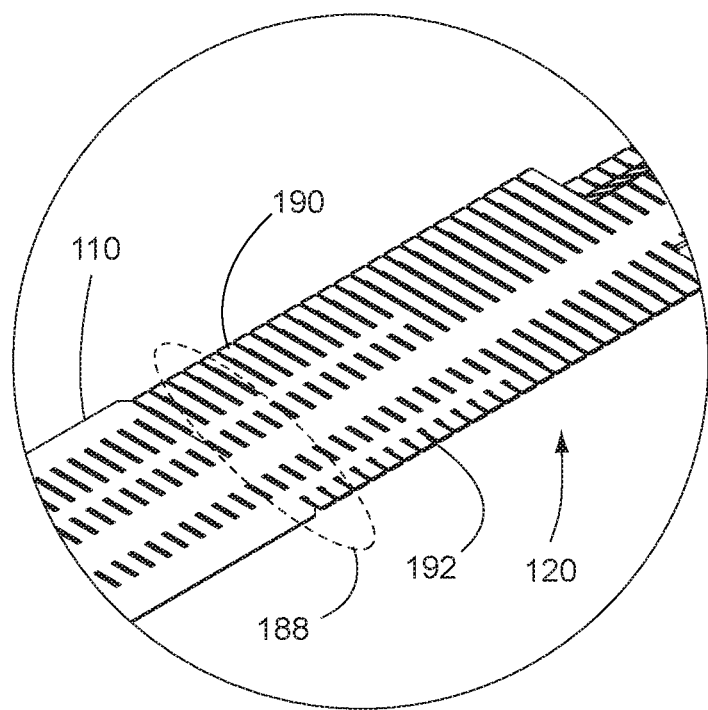
FIG. 13 is an enlarged view of the encircled portion of FIG. 12.

The perforation sets 180 are used to essentially score the first work blank 110 for subsequent cutting and bending operations. In this regard, reference is made to FIGS. 12 and 13. These drawings illustrate the application of mechanical operations in a second stage 120 to the first work blank 110. Specifically, FIGS. 12 and 13 illustrate the formation of cut sections 188 through a series of cutting operations associated with the second stage 120. As shown particularly in FIG. 13, the cut sections 188 comprise a first cut section 190, and a second cut section 192. The cut sections extend to opposing lateral edges of the first work blank 110.

Figure 14:
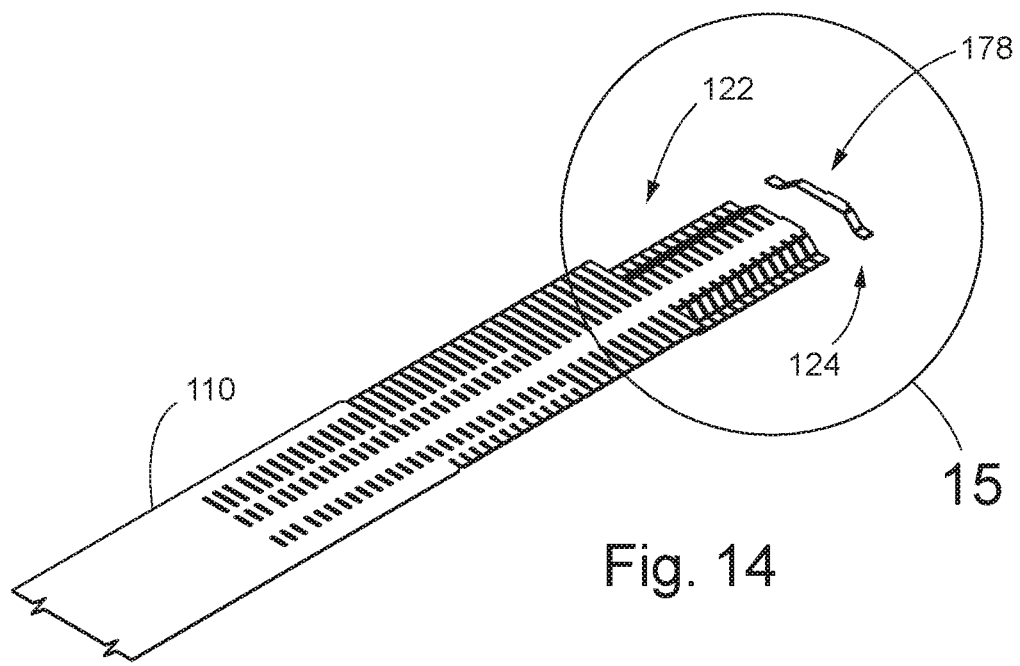
FIG. 14 is a perspective and diagrammatic view of the first work blank, with a circle which circumscribes the portion of the work blank where third stage mechanical operations are performed.
Figure 15:
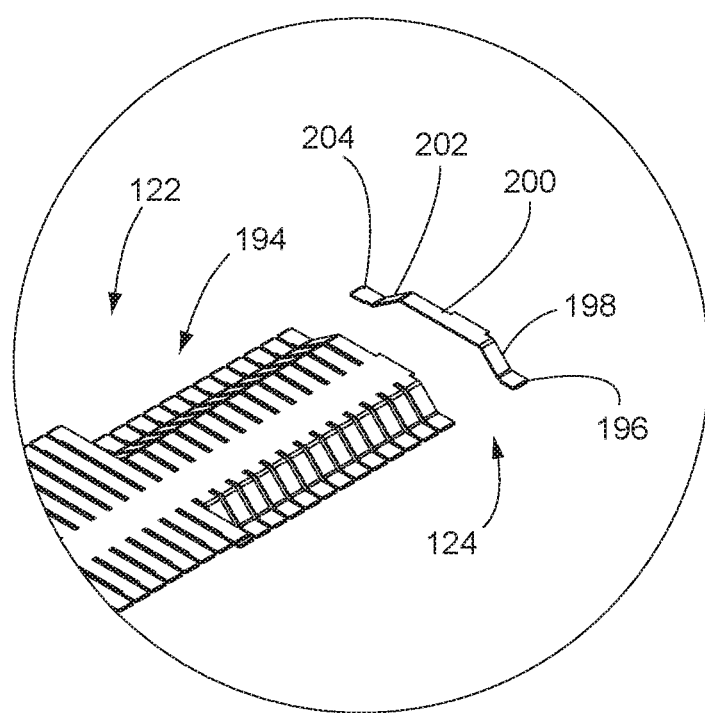
FIG. 15 is an enlarged view of the encircled portion of FIG. 14.

Following the second stage 120, the same area of the first work blank 110 is moved to a position for mechanical operations applied during a third stage 122. This stage is illustrated in FIGS. 14 and 15. In this stage, bending operations are performed so as to provide for bent sections 194. FIGS. 14 and 15 further show the result of mechanical operations performed during what could be characterized as a fourth stage 124. The fourth stage 124 essentially comprises the cutting away of individual sections of the first work blank 110 so as to form first work components 178. During the bending operations associated with the third stage 122, each piece which will become a first work component 178 comprises a first planar section 196, first angled section 198 integral with one end of the first planar section 196, and a second planar section 200 integral with an opposing end of the first angled section 198. In addition, the bent sections 194 include a second angled section 202 integral with an end of the second planar section 200, and a third planar section 204 integral with an opposing end of the second angled section 202.

Figure 16:
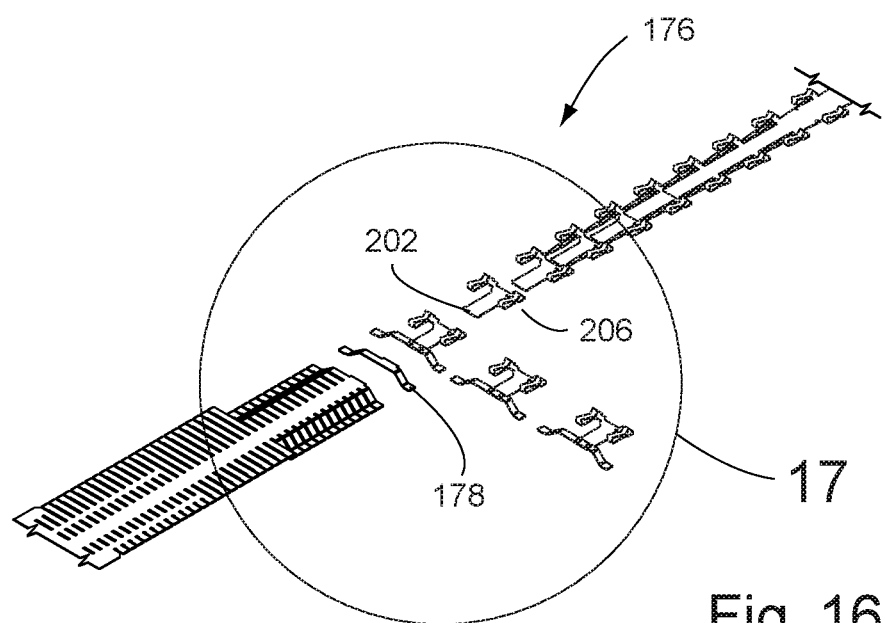
FIG. 16 is a perspective and diagrammatic view of the first work blank, with a circle which circumscribes a portion of the work blank where fourth stage mechanical operations are performed.
Figure 17:
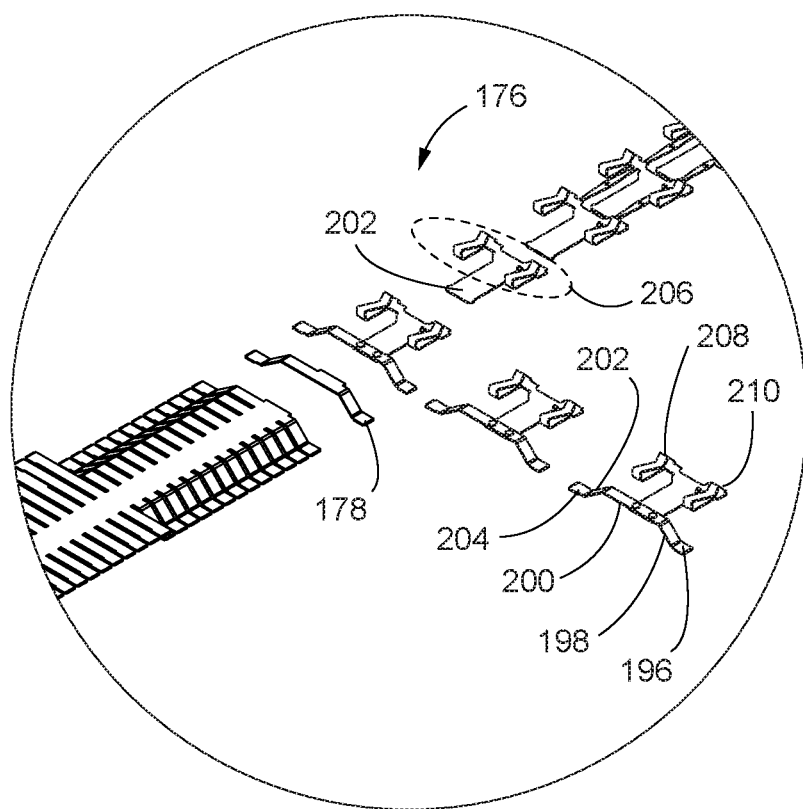
FIG. 17 is an enlarged view of the encircled portion of FIG. 16.

Following the mechanical operations associated with the fourth stage 124, the resultant first work component 178 is applied during a fifth stage 126 to coupling procedures, where each of the first work components 178 is connected to a corresponding one of the second work components 176. These operations are shown in FIGS. 16 and 17. In this particular embodiment, the coupling or interlocking of the first and second work components 176, 178 occurs through a toggle locking process which is particularly shown in the enlarged view of FIG. 17.

The connection of the first work component 178 to the second work component 176 can, from a practical viewpoint, form a buss bar with a pair of female terminals. The buss bar essentially consists of the first work component 178, while the female terminals and a section piece connected to the first work component 178 is formed as the second work component 176. An application for a somewhat similar buss bar having female terminals is illustrated in FIG. 18 as buss bar 220. FIG. 18 illustrates an exploded view of an electrical junction block having various buss bars for conducting power through the junction block and to integrally connected receptacles. This particular embodiment of an electrical device using a buss bar and female terminal configuration similar to that formed as shown in FIGS. 1-17 is disclosed as FIG. 37 in Byrne, U.S. Patent Application Publication No. 2014/0179132 published Jun. 26, 2014.

It should again be emphasized that although the mechanical operations applied to the work blanks so as to form the resultant first and second work components are described in a sequential manner in the application, the mechanical operations associated with each of these stages are all being performed simultaneously, albeit on different areas of the first and second work blanks. Further, each work component is being formed simultaneously with a corresponding one of the other work components. In this manner, efficiency is achieved with respect to time and overall operation. Also, it should again be emphasized that although a particular set of mechanical operations is illustrated with the embodiment described herein, and a connection methodology comprising a toggle lock process is also disclosed, various other mechanical operations and connection methods can be utilized, all within the scope of the concepts of the invention.

It will be apparent to those skilled in the pertinent arts that other embodiments of processes in accordance with the invention can be achieved. That is, the principles of the invention are not limited to the specific embodiment described herein. It will be apparent to those skilled in the art that modifications and other variations of the above-described illustrative embodiment of the invention may be effected without departing from the spirit and scope of the novel concepts of the invention.

The invention claimed is:

1. A method for manufacturing end products with a machine, the method comprising:
 loading first and second work blanks into the machine;
 simultaneously feeding the first and second work blanks into respective first and second conveyances of the machine, wherein the first and second conveyances are arranged on opposing sides of the machine;
 passing, with the first conveyance, the first work blank through a first plurality of sequential mechanical processing stages of the machine;
 passing, with the second conveyance, the second work blank through a second plurality of sequential mechanical processing stages of the machine;
 forming a first electrically conductive work component from the first work blank upon completion of the first plurality of mechanical processing stages on the first work blank, and continuing to form additional first work components from the first work blank, such that each time a final stage of the first plurality of mechanical processing stages ends, following an initial start-up, a new first work component is formed, wherein each of the first work components is individually separated from the first work blank;
 forming a second electrically conductive work component from the second work blank upon completion of the second plurality of mechanical processing stages on the second work blank, and continuing to form additional second work components from the second work blank, such that each time a final stage of the second plurality of mechanical processing stages ends, following an initial start-up, a new second work component is formed, wherein each of the second work components is individually separated from the second work blank;

synchronizing start and finish times of the first and second pluralities of mechanical processing stages, such that corresponding ones of the first and second work components are formed at substantially the same time;

wherein each of the first work components is physically proximate to corresponding ones of the second work components when formed; and directly coupling together each of the first work components to corresponding ones of the second work components with the machine, so as to manufacture individual ones of the end products, wherein each individual end product is separate from the other end products.

2. The method of claim 1, wherein the first work blank and the second work blank are metallic.

3. The method of claim 1, wherein the machine comprises a first feeder and a second feeder arranged on the opposing sides of the machine, wherein loading the first work blank into the machine comprises loading the first work blank into the first feeder of the machine, and wherein loading the second work blank into the machine comprises loading the second work blank into the second feeder of the machine.

4. The method of claim 1, wherein the first plurality of mechanical processing stages is different from the second plurality of mechanical processing stages.

5. The method of claim 1, wherein coupling together the first work component to the corresponding second work component comprises a toggle locking process, wherein the toggle locking process interconnects the first work component and the second work component through an interlock process, and wherein the first work component and the second work component are fastened together without a need for welding, glue, or separate fasteners.

6. The method of claim 1, wherein coupling together the first work component to the corresponding second work component comprises the use of weldments.

7. The method of claim 1, wherein the first work blank is loaded on a continuous feed reel in the form of a sheet metal roll, and wherein the second work blank is loaded on a continuous feed reel in the form of a sheet metal roll.

8. The method of claim 1, wherein the first work blank is formed into a plurality of first work components, each having an elongated configuration and adapted for use as conductive buss bars.

9. The method of claim 1, wherein the first work component comprises a buss bar comprising an elongated configuration with a first planar section, a first angled section integral with the first planar section, a second planar section integral with the first angled section, a second angled section integral with the second planar section, and a third planar section integral with the second planar section, so that opposing ends of the first and the third planar sections comprise male blade terminals.

10. The method of claim 1, wherein the second work blank comprises an elongated and planar roll of sheet metal.

11. The method of claim 10, wherein a first mechanical process of the second plurality of mechanical processing stages comprises a formation of a pair of elongated perforations parallel to each other and extending longitudinally along the second work blank.

12. The method of claim 11, wherein a second mechanical process of the second plurality of mechanical processing stages comprises bending of opposing sections of the second work blank.

13. The method of claim 12, wherein a third mechanical process of the second plurality of mechanical processing stages comprises a further bending back of the previously bended sections, so as to form a pair of female terminals located along opposing edges of the second work blank.

14. The method of claim 13, wherein each second work component comprises a terminal piece comprising a pair of electrical female terminal pairs with the female terminals positioned on opposing lateral sides, a central planar section extending longitudinally along a center line of each formed piece, wherein the center section is integral with the electrical female terminal pairs, and positioned between female terminals of the terminal pairs.

15. The method of claim 1, wherein each end product comprises:
   a buss bar comprising an elongated configuration with a first planar section, a first angled section integral with the first planar section, a second planar section integral with the first angled section, a second angled section integral with the second planar section, and a third planar section integral with the second planar section, so that opposing ends of the first and third planar sections comprise male blade terminals;
   a terminal piece comprising a pair of electrical female terminal pairs, each positioned on opposing lateral sides, a central planar section extending longitudinally along a center line of each formed piece, wherein the center section is integral with the electrical female terminal pairs, and positioned between female terminals of the terminal pairs; and
   wherein the buss bar is secured to the terminal piece through toggle locking connections between the second planar section of the buss bar and the center planar section of the terminal piece.

16. The method of claim 1, wherein a movement of the first work blank through the first plurality of mechanical processing stages is synchronized with a movement of the second work blank through the second plurality of mechanical processing stages.

17. The method of claim 1, wherein each first work component is simultaneously formed with a corresponding one of the second work components.

18. The method of claim 1, wherein the machine is configured such that the first and second conveyances receive first and second work blanks, respectively, in opposing directions.

19. A method for manufacturing end products with a machine, the method comprising:
   loading first and second work blanks into the machine, wherein the first work blank comprises an elongated and substantially planar roll of sheet metal;
   simultaneously feeding the first and second work blanks into respective first and second conveyances of the machine, wherein the first and second conveyances are arranged on opposing sides of the machine;
   passing, with the first conveyance, the first work blank through a first plurality of sequential mechanical processing stages of the machine;
   passing, with the second conveyance, the second work blank through a second plurality of sequential mechanical processing stages of the machine;
   forming a first work component from the first work blank upon completion of the first plurality of mechanical processing stages on the first work blank, and continuing to form additional first work components from the first work blank, such that each time a final stage of the first plurality of mechanical processing stages ends, following an initial start-up, a new first work component is formed, wherein each of the first work components is individually separated from the first work blank, and wherein the first plurality of mechanical processing stages comprises a stamping of perforations inwardly from opposing lateral edges of the first work blank;

forming a second work component from the second work blank upon completion of the second plurality of mechanical processing stages on the second work blank, and continuing to form additional second work components from the second work blank, such that each time a final stage of the second plurality of mechanical processing stages ends, following an initial start-up, a new second work component is formed, wherein each of the second work components is individually separated from the second work blank;

synchronizing start and finish times of the first and second pluralities of mechanical processing stages, such that corresponding ones of the first and second work components are formed at substantially the same time;

wherein each of the first work components is physically proximate to corresponding ones of the second work components when formed; and coupling together each of the first work components to corresponding ones of the second work components with the machine, so as to manufacture individual ones of the end products, wherein each individual end product is separate from the other end products.

20. The method of claim 19, wherein the first plurality of mechanical processing stages comprises a stamping of perforations adjacent opposing lateral edges of the first work blank.

21. The method of claim 20, wherein the first plurality of mechanical processing stages comprises a bending of predetermined sections of the first work blank.

22. The method of claim 21, wherein the first plurality of mechanical processing stages comprises a stamp cutting of the first work blank following formation of perforations and bending of sections of the first work blank, so as to form a plurality of identical first work components.

23. A method for manufacturing end products with a machine, the method comprising:

loading first and second work blanks into the machine;

simultaneously feeding the first and second work blanks into respective first and second conveyances of the machine, wherein the first and second conveyances are arranged on opposing sides of the machine;

passing, with the first conveyance, the first work blank through a first plurality of sequential mechanical processing stages of the machine;

passing, with the second conveyance, the second work blank through a second plurality of sequential mechanical processing stages of the machine;

forming a first work component from the first work blank upon completion of the first plurality of mechanical processing stages on the first work blank, and continuing to form additional first work components from the first work blank, such that each time a final stage of the first plurality of mechanical processing stages ends, following an initial start-up, a new first work component is formed, wherein the first plurality of mechanical processing stages comprises at least one of a perforating stage, a bending stage, and a cutting stage;

after the first plurality of mechanical processing stages, individually separating each of the first work components from the first work blank;

forming a second work component from the second work blank upon completion of the second plurality of mechanical processing stages on the second work blank, and continuing to form additional second work components from the second work blank, such that each time a final stage of the second plurality of mechanical processing stages ends, following an initial start-up, a new second work component is formed, wherein each of the second work components is individually separated from the second work blank;

synchronizing start and finish times of the first and second pluralities of mechanical processing stages, such that corresponding ones of the first and second work components are formed at substantially the same time;

wherein each of the first work components is physically proximate to corresponding ones of the second work components when formed; and coupling together each of the first work components to corresponding ones of the second work components with the machine, so as to manufacture individual ones of the end products, wherein each individual end product is separate from the other end products.

* * * * *